United States Patent
Miyajima et al.

(10) Patent No.: US 7,648,003 B2
(45) Date of Patent: Jan. 19, 2010

(54) POWER STEERING SYSTEM

(75) Inventors: Ayumu Miyajima, Chiyoda-ku (JP);
Isamu Tsubono, Chiyoda-ku (JP);
Takaomi Nishigaito, Chiyoda-ku (JP);
Toru Takahashi, Chiyoda-ku (JP);
Mitsuo Sasaki, Chiyoda-ku (JP);
Toshimitsu Sakaki, Chiyoda-ku (JP);
Tatsuo Matsumura, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 11/654,676

(22) Filed: Jan. 18, 2007

(65) Prior Publication Data
US 2007/0209859 A1 Sep. 13, 2007

(30) Foreign Application Priority Data
Mar. 9, 2006 (JP) ............................. 2006-064492

(51) Int. Cl.
*B62D 5/06* (2006.01)
(52) U.S. Cl. ..................... 180/422; 180/441; 180/421
(58) Field of Classification Search ................. 180/422, 180/446, 421, 441, 442
See application file for complete search history.

(56) References Cited
U.S. PATENT DOCUMENTS

2005/0178607 A1* 8/2005 Kodama et al. ............. 180/422
2005/0257994 A1* 11/2005 Fujita ........................ 180/446
2006/0070792 A1* 4/2006 Soeda ........................ 180/422
2006/0081411 A1* 4/2006 Soeda et al. ................. 180/422
2006/0108172 A1* 5/2006 Watanabe .................... 180/422
2006/0175118 A1* 8/2006 Hirakushi et al. ........... 180/422

FOREIGN PATENT DOCUMENTS
JP 2003-212141 A 7/2003
JP 2005-349883 A 12/2005

* cited by examiner

Primary Examiner—Paul N Dickson
Assistant Examiner—Tashiana Adams
(74) Attorney, Agent, or Firm—Crowell & Moring LLP

(57) ABSTRACT

In a power steering system comprising a power cylinder for assisting a steering power of a steering mechanism, a hydraulic pump for supplying a hydraulic pressure to the power cylinder, a first oil passage and a second oil passage connecting the power cylinder and the hydraulic pump respectively, a motor for driving the hydraulic pump, and power steering control means for calculating a command value to the motor based on the steering torque, a flow rate of the working oil supplied from a high-pressure side oil passage to a low-pressure side oil passage is restrained at the transition from the end of the steering state (lock end) of the steering mechanism to the returning. The flow-rate restraint increasingly corrects a driving current of the motor in the steering direction or limits the flow rate of the working oil.

15 Claims, 10 Drawing Sheets

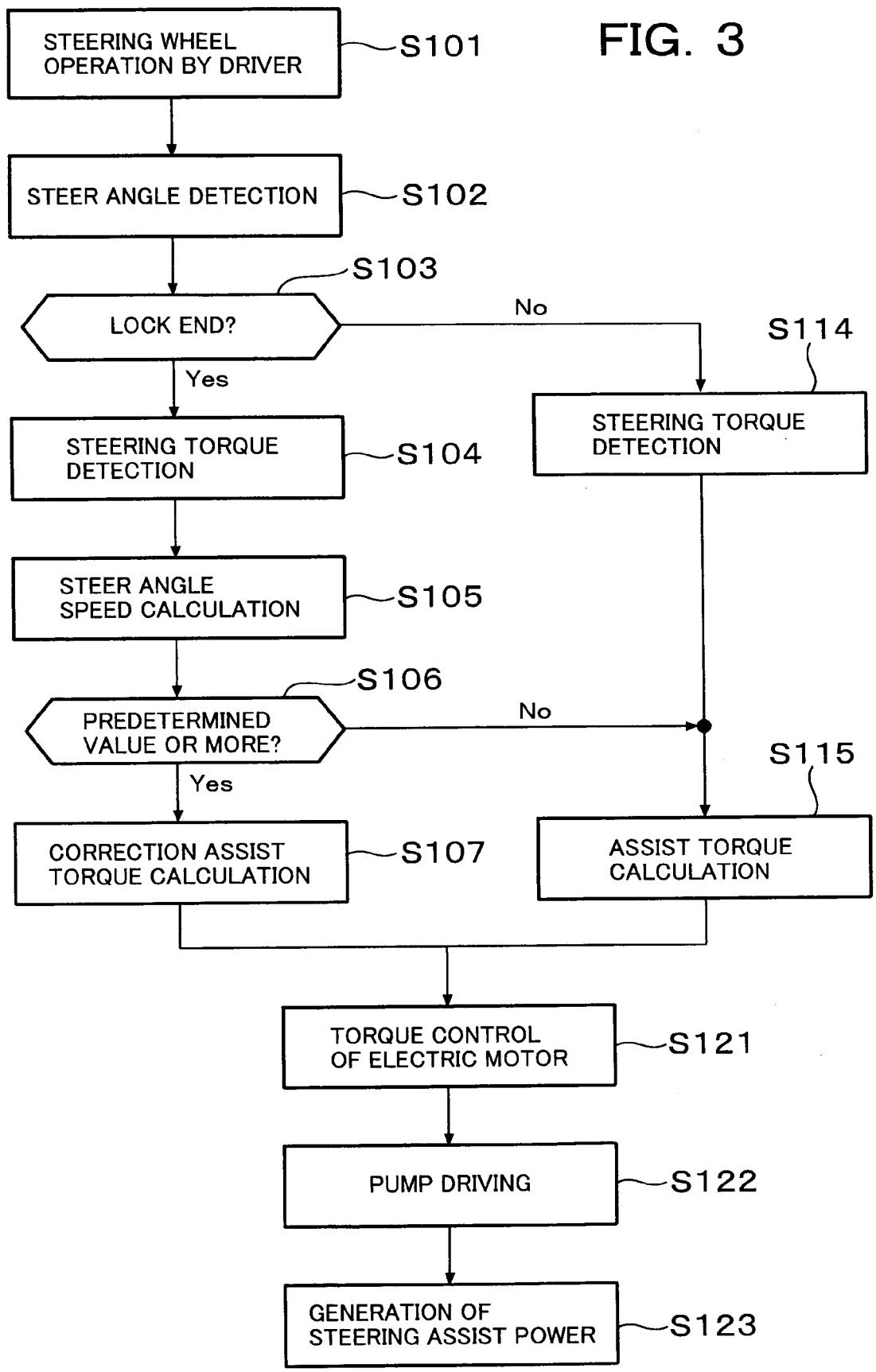

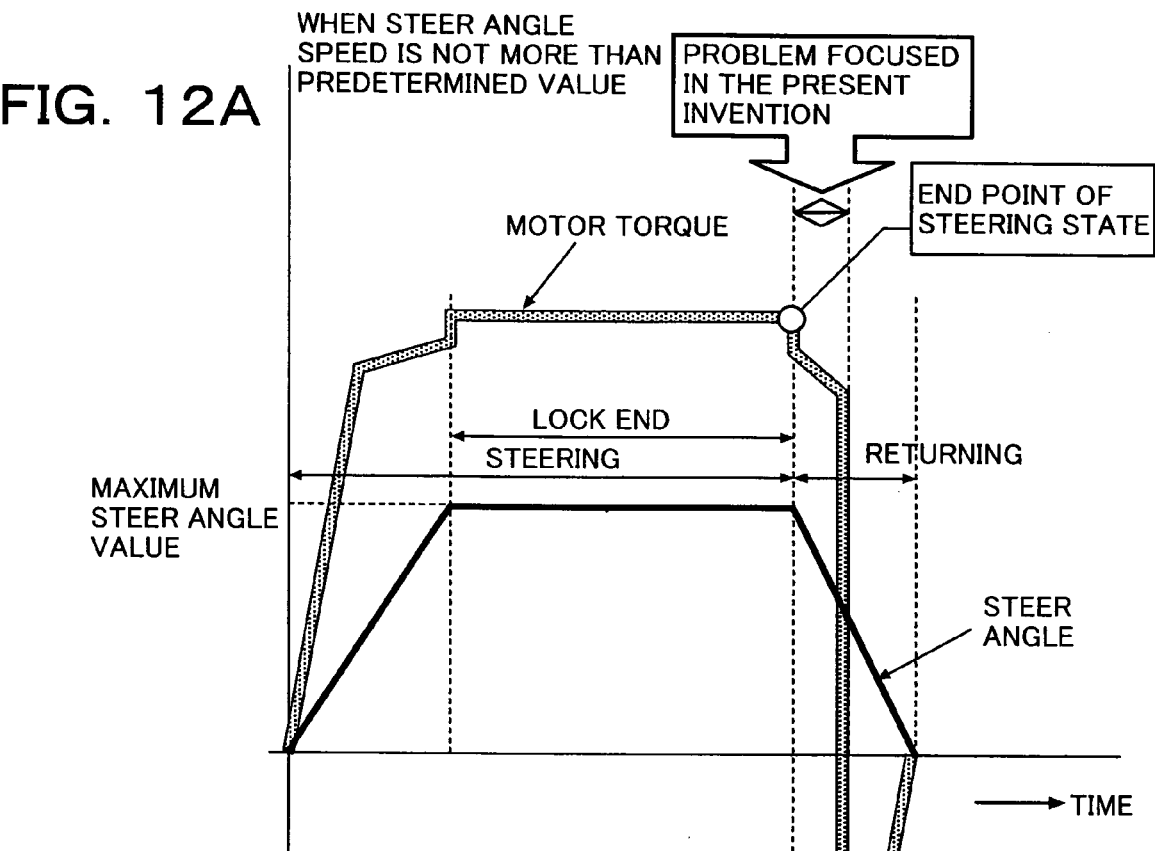

POWER STEERING SYSTEM

BACKGROUND OF THE INVENTION

1. Field of the Invention

The present invention relates to a power steering system for assisting a steering power of a wheel and to a control device of an electric motor which attempts improvement of a steering feel at lock end of a steering wheel.

2. Related Background of the Invention

As a power assist device for assisting power of a wheel steering according to a steering torque input from a driver, a hydraulic mechanism is usually used. As an example of this prior art, such a technology is proposed that a hydraulic pressure is generated by driving an oil pump using an electric motor and the steering torque inputted from a steering wheel to this generated hydraulic pressure is feedback-controlled so as to generate a steering assist power (See Patent Document 1, for example). With the prior art as shown in Patent Document 1, a steering torque is detected from a value of a torque sensor and the steering assist power is generated according to the torque so as to control a pressure to be supplied to a hydraulic cylinder.

[Patent Document 1] Japanese Patent Application Laid-Open No. 2003-212141

However, with the prior art shown in the above Patent Document 1, the electric motor is controlled in proportion to the detected steering torque all the time, no matter whether the steering state is in a normal steering state or a lock end state. Therefore, a correcting method for an assist power in a region where a characteristic on a load side is changed such as, for example, at the lock end of the steering wheel, or a control method of an electric motor which can improve a steering feel at the lock end of the steering wheel has not been given sufficient consideration.

Generally, when the steering wheel is brought to the lock end, if a vehicle is moving forward, a steering tire generates a torque to return the steering wheel to a neutral position direction (A return torque is generated by a reaction force from the tire, which will be described in FIG. 2). On the other hand, if the vehicle is going backward, the steering tire generates a torque to further turn the steering wheel in the turning direction. Therefore, if the steering wheel is returned from the lock end in the backward movement of the vehicle, a power steering system needs to generate the largest steering assist power against the torque from the steering tire.

However, with the prior art, a torque generated by distortion between the steering wheel and the load side is detected by a torque sensor, and a steering assist power in proportion to the detected torque is generated using only the detected torque information. In this case, if a turning speed by the driver to return the steering wheel exceeds a predetermined value, a flow rate of working oil flowing from an assist-side (high-pressure side) cylinder to a non-assist side (low pressure side) cylinder becomes excessive, the working oil flows excessively through a relief valve provided at a pump, and thus a fluid flow phenomenon such as surging and water hammer occurs in a transient manner, which causes a problem of noise.

SUMMARY OF THE INVENTION

An object of the present invention is to provide a power steering system provided with a control device for restraining a noise generated due to excessive flow of hydraulic fluid through a relief valve provided at a pump at transition of a steering wheel from lock end (end of steering state) to returning.

In order to solve the above problem, the present invention employs mainly the following construction.

This is a power steering system provided with a power cylinder for assisting a steering power of a steering mechanism made of a rack and pinion and the like connected to a steering tire, a hydraulic pump having a pair of discharge ports for selectively supplying a hydraulic pressure to both pressure chambers of the power cylinder, a first oil passage and a second oil passage for connecting each of the pair of discharge ports of the hydraulic pump to both the pressure chambers of the power cylinder, respectively, a motor for driving the hydraulic pump, and power steering control means for calculating a command value to the motor based on a steering torque by operation of a steering wheel, in which a flow rate of hydraulic fluid supplied from a high-pressure side oil passage to a low-pressure side oil passage in the first oil passage and the second oil passage is restrained at the end of steering state of the steering mechanism or at transition from lock end to returning.

Also, in the above power steering system, the flow-rate restraint of the hydraulic fluid is carried out by increasing correction of a driving current of the motor in the steering direction. Moreover, in the above power steering system, the flow-rate restraint of the hydraulic fluid is carried out by limiting the flow rate of the hydraulic fluid supplied from the high-pressure side oil passage to the low-pressure side oil passage. This flow-rate limitation of the hydraulic fluid is carried out by limiting the flow rate of the hydraulic fluid supplied from the high-pressure side oil passage to the low-pressure side oil passage by providing a valve between each of the first oil passage and the second oil passage and an oil tank and by open-controlling the valve.

Moreover, in the above power steering system, a steer angle sensor for detecting a steer angle of the steering mechanism is provided for determining whether the state is lock end or not based on the steer angle by the steer angle sensor, and if the determination result is a lock end state, a flow rate of the hydraulic fluid supplied from the high-pressure side oil passage to the low-pressure side oil passage is restrained if the steer angle speed calculated based on the steer angle detected by the steer angle sensor is not less than a predetermined value.

According to the present invention, when the steering state of the steering mechanism is ended and transited to returning, the flow rate of the hydraulic fluid flowing from the high-pressure side oil passage to the low-pressure side oil passage is restrained so that an inflow rate of the hydraulic fluid through the relief valve provided at the pump can be rectified. By this, occurrence of a transient fluid flow phenomenon such as surging or water hammer can be restrained, generation of noise or transmission of vibration to a steering wheel can be prevented, and steering feel can be improved.

BRIEF DESCRIPTION OF THE DRAWINGS

FIG. 3 is a flowchart showing a procedure of driving torque control of a motor at lock end/normal steering in a power steering system according to a first embodiment of the present invention.

FIG. 12 is a schematic diagram for explaining a problem to be solved and means for solving the problem in the power steering system according to the embodiment of the present invention.

DESCRIPTION OF THE PREFERRED EMBODIMENTS

Figure 8:
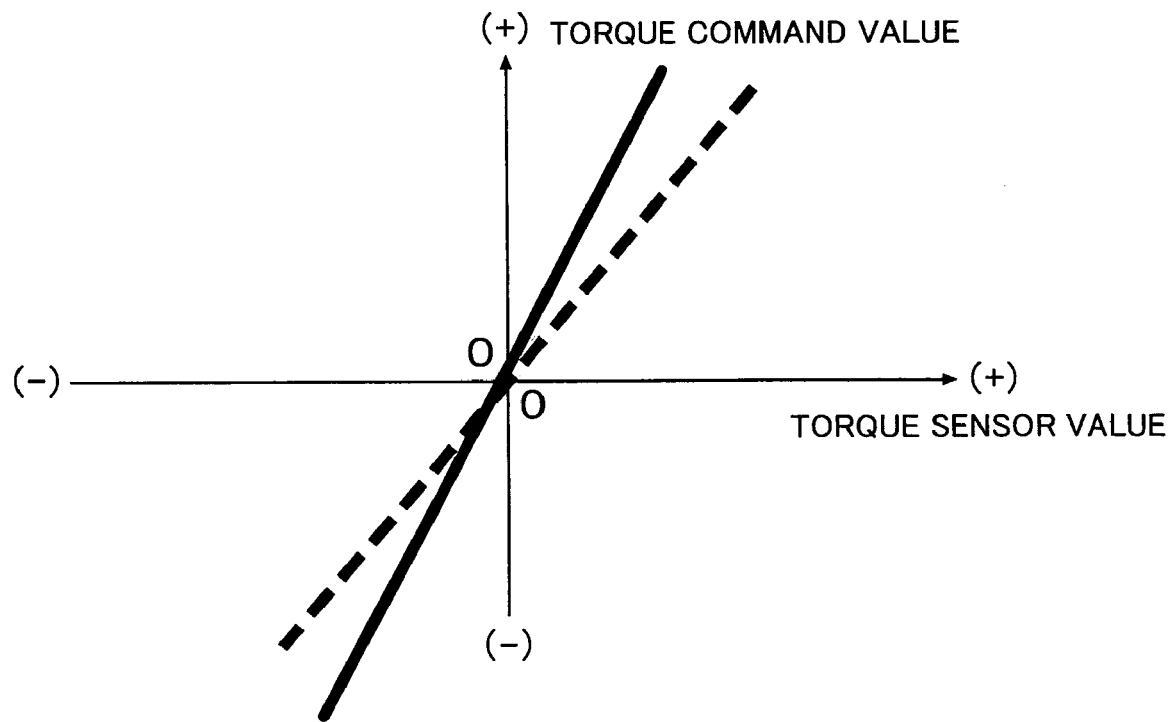
FIG. 8 is an explanatory diagram showing an example of a correction torque command value generation map at the lock end in the first embodiment.
Figure 9:
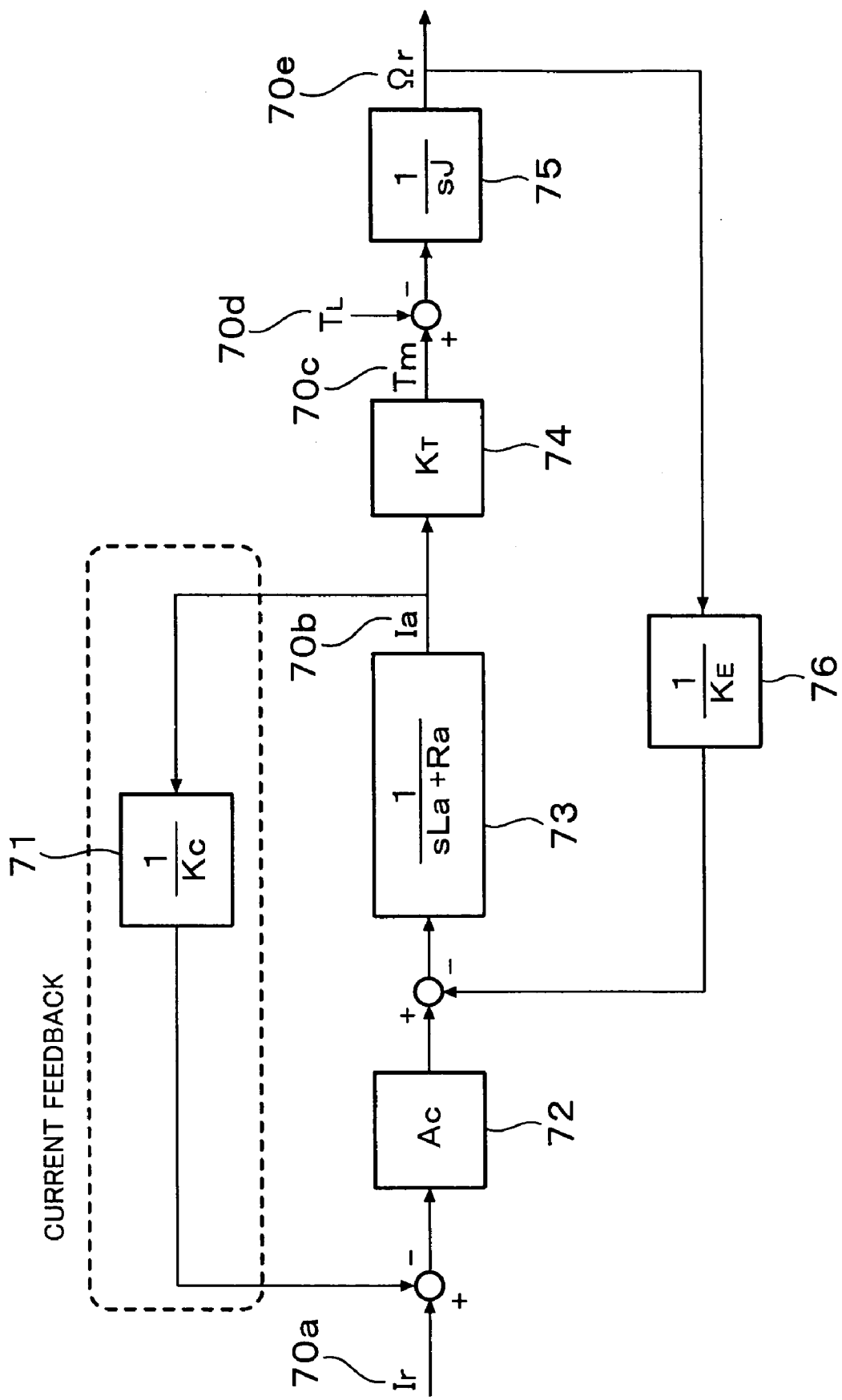
FIG. 9 is a block diagram showing a motor driver and an electric motor in the first embodiment.
Figure 10:
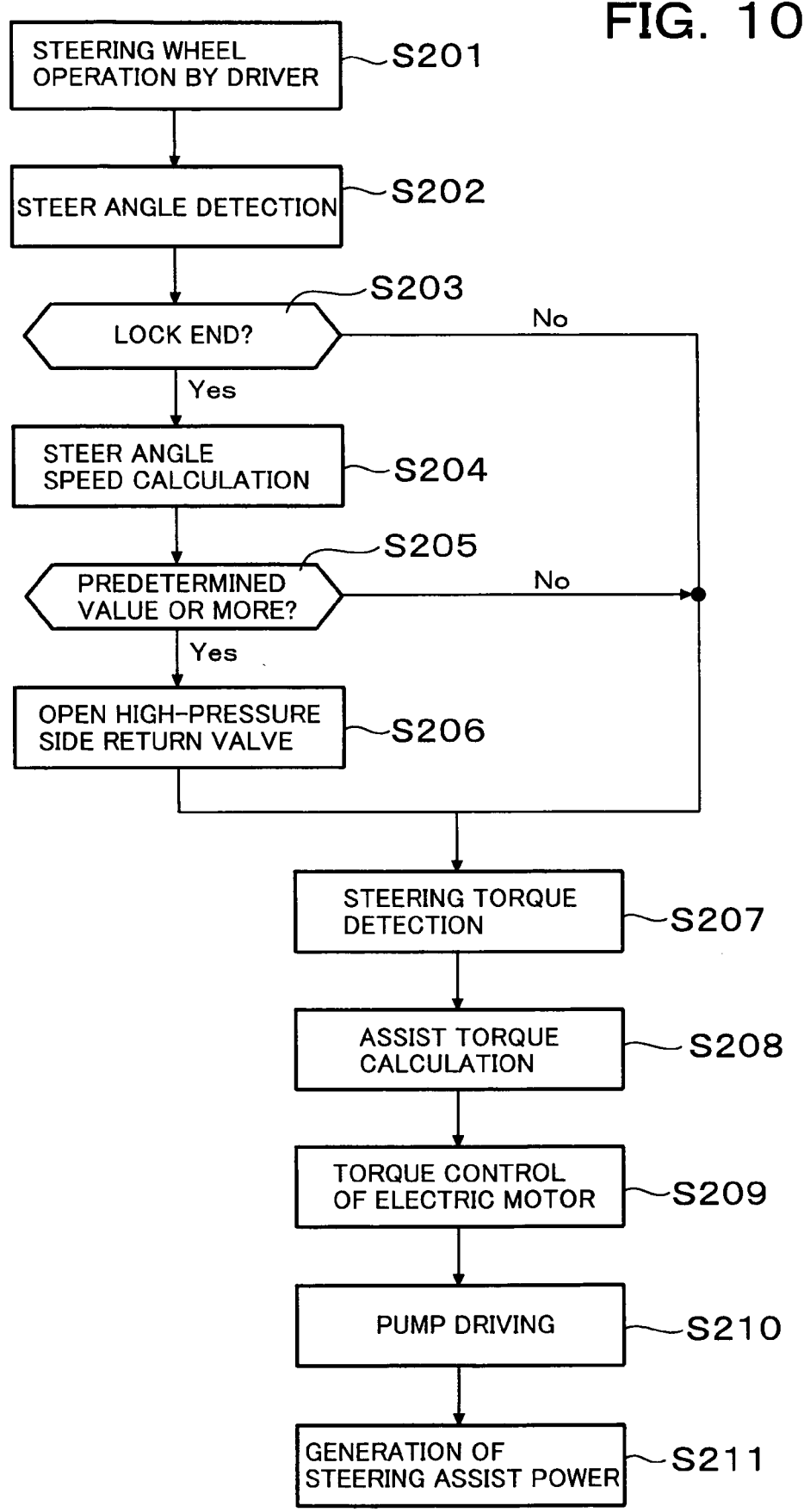
FIG. 10 is a flowchart showing a procedure of working-oil flow rate control and motor control at the lock end/normal steering in a power steering system according to the second embodiment of the present invention.
Figure 11:
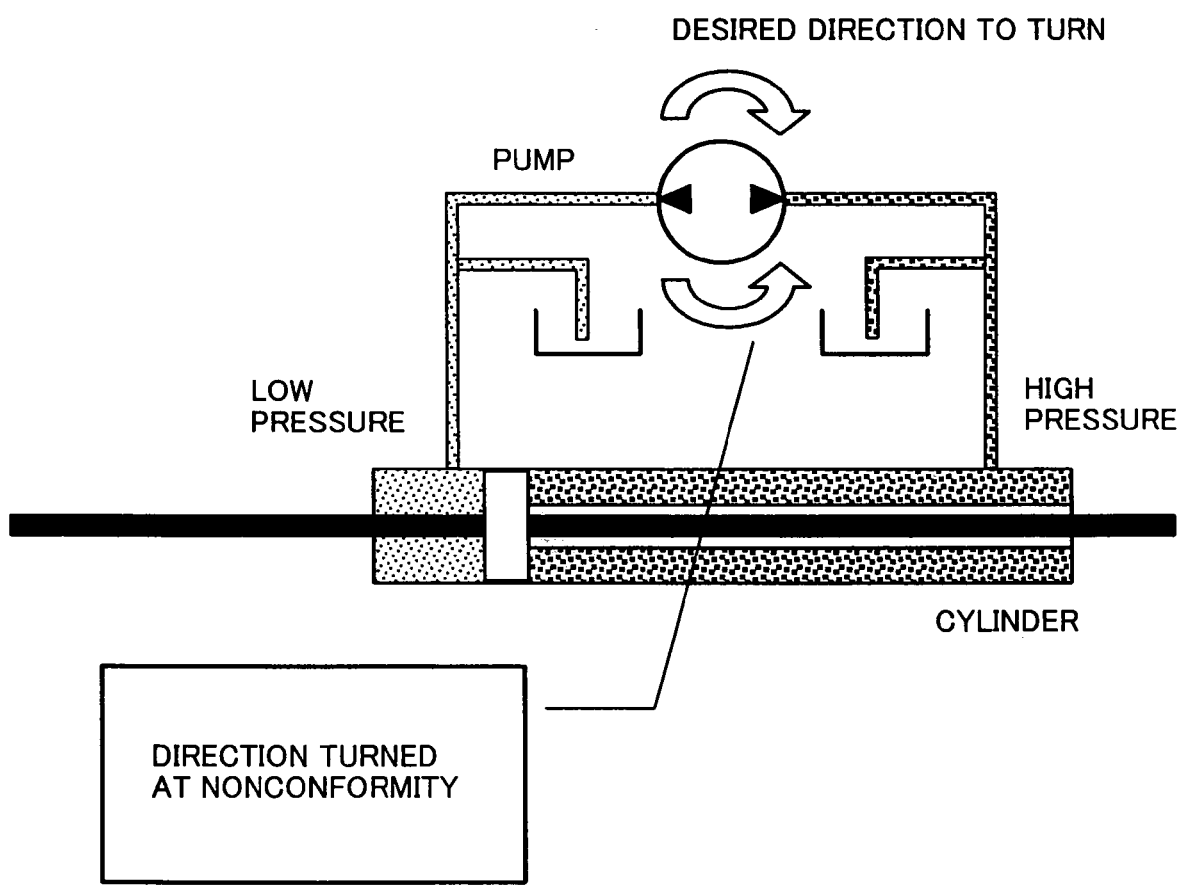
FIG. 11 is a diagram for explaining excessive inflow of working oil from a high-pressure side oil passage to a low-pressure side oil passage when a steering state of the steering mechanism in the power steering system according to this embodiment is finished and transited to return.

A power steering system according to an embodiment of the present invention will be described in detail referring to FIGS. 1 to 12. FIGS. 1 to 9 are diagrams for explaining a power steering system according to a first embodiment of the present invention, and FIG. 10 is a diagram for explaining a power steering system according to a second embodiment. FIG. 11 is a diagram for explaining excessive inflow of working oil from a high-pressure side oil passage to a low-pressure side oil passage when a steering state of the steering mechanism in the power steering system according to this embodiment is ended and transited to returning. FIG. 12 is a schematic diagram for explaining a problem to be solved and means for solving the problem in the power steering system according to the embodiment of the present invention.

Figure 1:
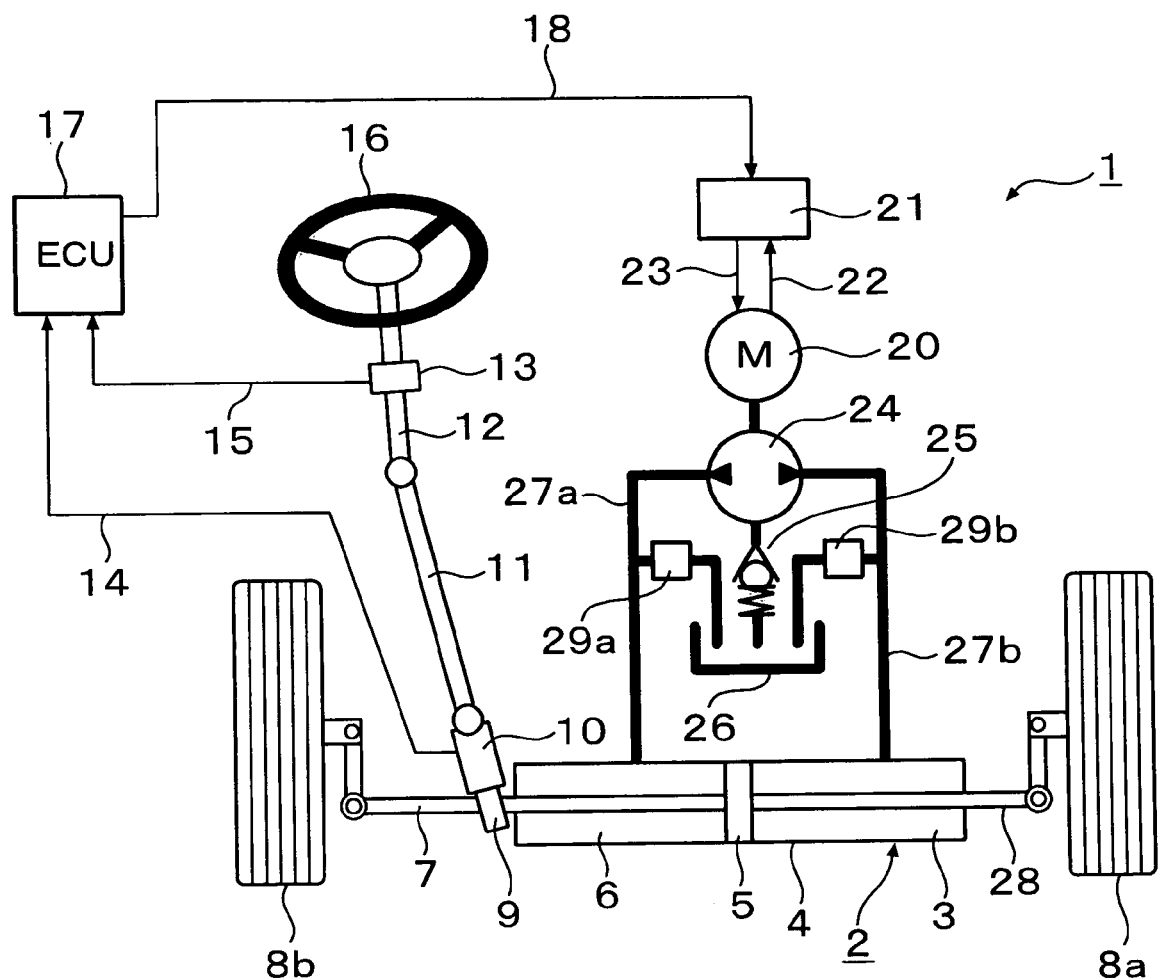
FIG. 1 is a diagram showing an entire construction of a power steering system according to first and second embodiments of the present invention.
Figure 4:
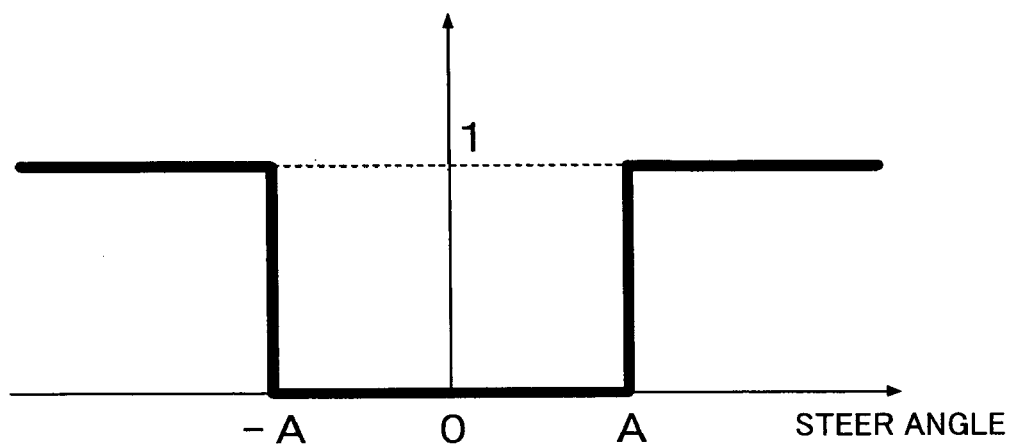
FIG. 4 is a diagram showing setting of a determination flag of lock end in this embodiment.
Figure 5:
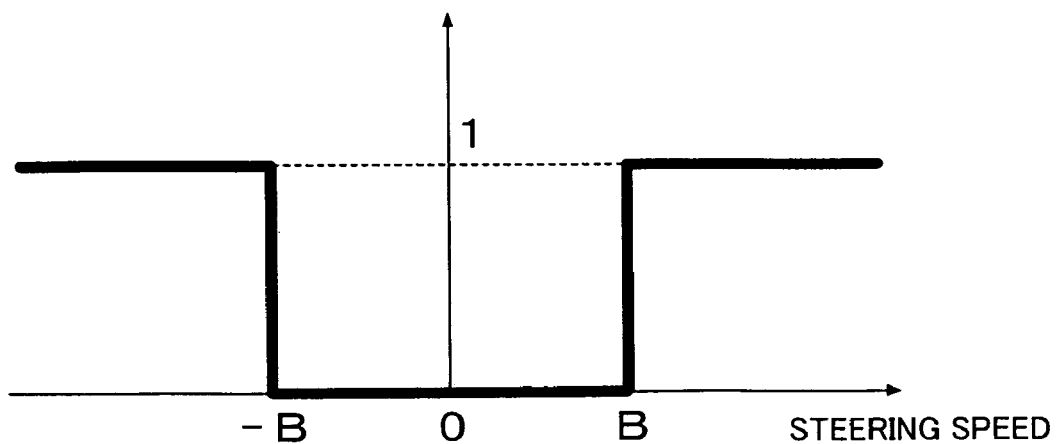
FIG. 5 is a diagram showing setting of a determination flag of a steering speed in this embodiment.
Figure 6:
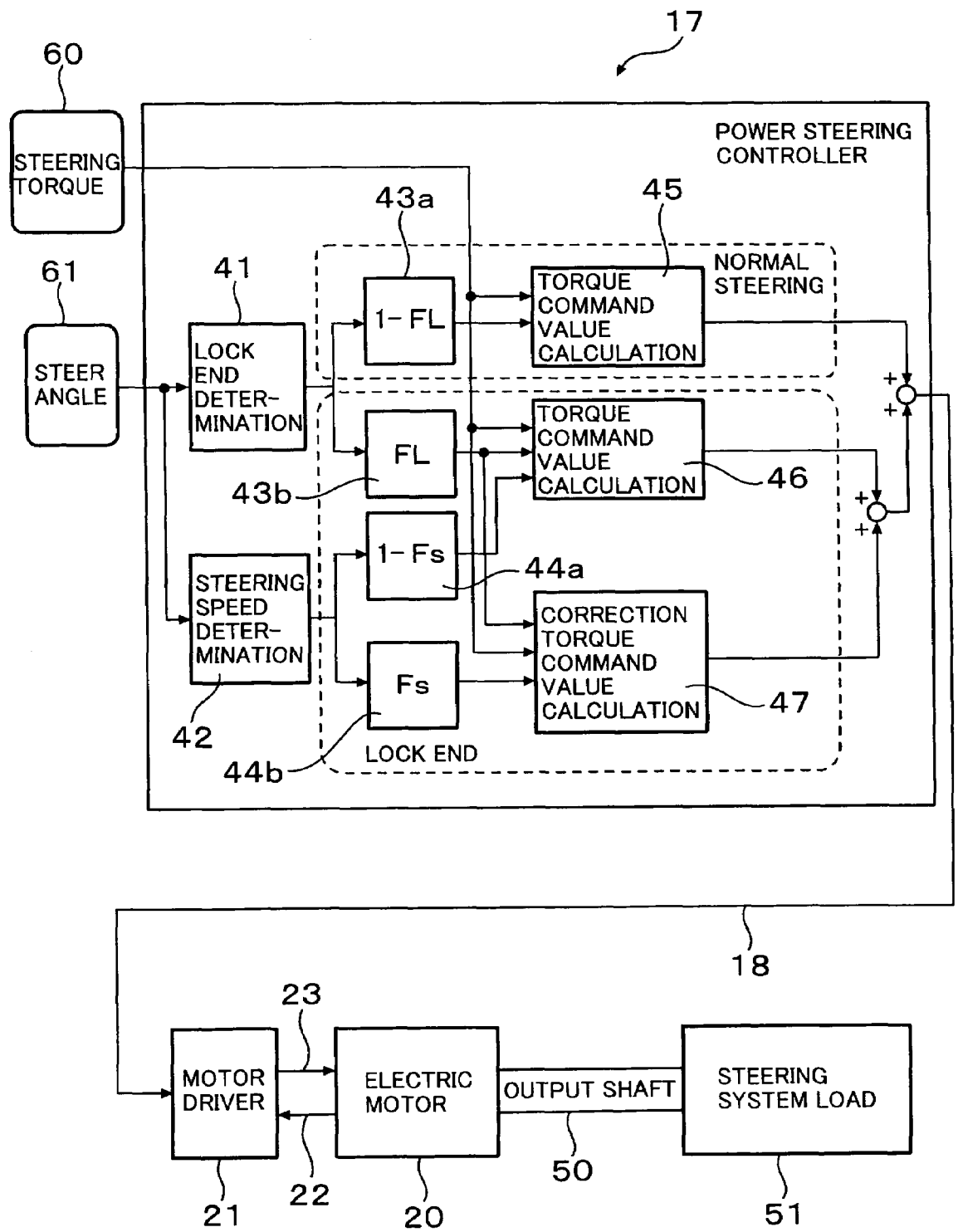
FIG. 6 is a diagram showing a motor command value generation circuit of a power steering control unit in the power steering system according to the first embodiment.
Figure 7:
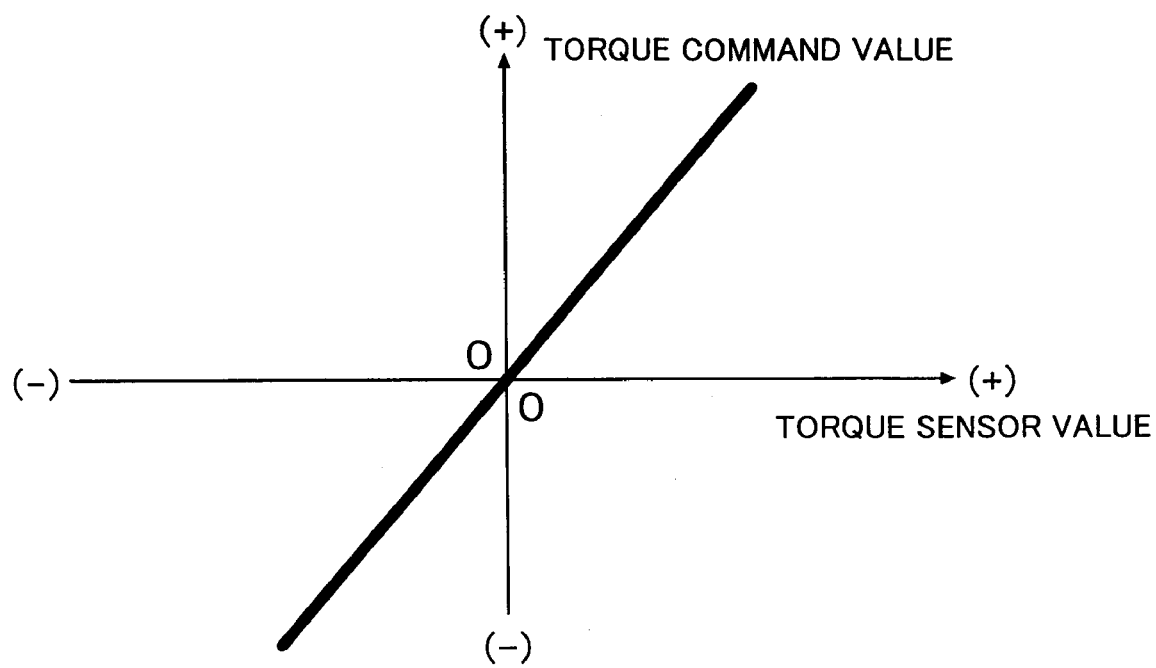
FIG. 7 is an explanatory diagram showing an example of a torque command value generation map at the normal steering in the first embodiment.

FIG. 1 is a diagram showing an entire construction of a power steering system according to the first and the second embodiments of the present invention. FIG. 2 is a diagram showing a moment generated at a steering tire at moving forward or backward of a vehicle of this embodiment. FIG. 3 is a flowchart showing a procedure of driving torque control of a motor at lock end/normal steering in the power steering system according to the first embodiment of the present invention. FIG. 4 is a diagram showing setting of a determination flag of lock end in this embodiment. FIG. 5 is a diagram showing setting of the determination flag of a steering speed in this embodiment. FIG. 6 is a diagram showing a motor command value generation circuit of a power-steering control unit in the power steering system according to the first embodiment. FIG. 7 is an explanatory diagram showing an example of a torque command value generation map at the normal steering in the first embodiment. FIG. 8 is an explana-tory diagram showing an example of a correction torque command value generation map at the lock end in the first embodiment. FIG. 9 is a block diagram showing a motor driver and an electric motor in the first embodiment. FIG. 10 is a flowchart showing a procedure of working oil flow rate control and motor control at the lock end/normal steering in the power steering system according to the second embodiment of the present invention.

First, an outline of the power steering system according to the embodiment of the present invention will be described. When steering of the steering mechanism is ended, that is, at transition from lock end to returning (including no-hand on the steering wheel) (See FIG. 12), by controlling a driving torque of a motor for driving a hydraulic pump in a hydraulic power cylinder or by controlling a flow rate of working oil from a high-pressure side oil passage to a low-pressure side oil passage, an inflow rate of the working oil flowing from a high pressure side (assist side) cylinder to a low pressure side (non-assist side) cylinder is rectified, and this rectification prevents excessive flow of the working oil from a relief valve (denoted by reference numeral 25 in FIG. 1) to a tank 26, eliminates noise generation due to surging or water hammering generated at the relief valve 25, and prevents transmission of vibration to the steering wheel so as to improve steer feel.

Moreover, an outline of the power steering system according to this embodiment will be described referring to FIGS. 11 and 12. FIG. 12 is a diagram showing a steering state with the lateral axis as time and the vertical axis as a steer angle and a motor torque. FIG. 12a shows the case where the steer angle speed is not more than a predetermined value, and FIG. 12b shows the case where it is not less than the predetermined value (when steered back abruptly) (which will be described in detail later). In this embodiment, solution of nonconformity of an action in a range from the end of lock end (end point of steering state) to a given point of time is focused.

Terms described in this specification shall be defined as follows. That is, referring to FIG. 12, the steering refers to operation of a steering wheel in a direction from a neutral state to increase the steer angle, the returning refers to operation of the steering wheel to decrease the steer angle to the neutral state, and the lock end refers to a state where particularly the steer angle is not increased any more in the steering operation. A problem focused in this embodiment is to handle a situation that "excessive working oil flows from the high pressure side to the low pressure side of a cylinder from an instant when the steer angle begins to decrease from the end point of the steering state (from lock end) to the neutral direction to a given point of time".

A reason why the excessive working oil (oil) flows will be described referring to FIG. 11. If the steering is returned rapidly at the end of the lock end, the motor torque is defeated by a differential pressure, and this differential pressure rotates the motor in a direction opposite to the desired direction to be rotated (the motor is rotated in a direction opposite to a command value to the motor). That is, a direction of a steering torque generated in the steering mechanism such as rack and pinion does not match the direction of the rotation of the motor. Thus, the timing to reverse the pump rotating direction is advanced, and excessive oil flows from the high pressure side to the low pressure side.

Therefore, in the first embodiment of the present invention, in order not to be defeated by the differential pressure, increase of the motor driving torque (to brake so that the pump rotating direction is not reversed too early, that is, to increasingly correct the driving current to the steering direction of the motor) is an important point (which will be described later shown in FIGS. 6 and 8). Also, in the flowcharts shown in FIGS. 3 and 10, which will be described later, though there is no explicit description on detection of returning operation, a situation of rapid change in the steer angle after the "lock end" is inevitably "rapid return" or "no-hand on the steering wheel". Thus, the present invention aims at improving steer feel at returning or no-hand on the steering wheel triggered by the "lock end". A specific construction of the present invention will be described below.

A power steering system according to the first embodiment of the present invention will be described below referring to FIGS. 1 to 9. A power steering system 1 steers wheels 8*a*, 8*b* by detecting a steering torque input from a driver, calculating an assist power command value by a control unit 17, and driving an electric motor 20. Steering input means comprises a steering wheel 16, a steering shaft 12 and an output shaft 11 engaged with the steering wheel for transmitting a steering torque, a steer angle sensor 13 provided at the steering shaft 12, a pinion 9 provided at the output shaft 11 and a steer angle torque sensor 10 for detecting the steering torque, and a rack 7 to be brought into contact with the pinion 9.

In a hydraulic power cylinder 2 for generating the assist power, a piston rod 28 connected to the rack 7 penetrates through a cylinder 4 extended in the car-body width direction, and a piston 5 sliding in the cylinder 4 is fixed to the piston rod 28. In the cylinder 4, right and left chambers, hydraulic chamber 3 and hydraulic chamber 6, are formed by the piston 5. The wheel 8*a* is connected to the end of the piston rod 28 through the rack 7, while the wheel 8*b* to the end of the piston rod 28, through a link respectively.

To a reversible pump 24 which can rotate forward/backward for generating a hydraulic pressure, hydraulic pipes 27*a*, 27*b* are connected, each of which is connected to the hydraulic chambers 6, 3, and an oil tank 26 storing working oil through a relief valve 25 is also connected. This oil tank 26 recovers the working oil leaking from the reversible pump. Also, return valves 29*a*, 29*b* capable of electric control of opening/closing are provided at the left and right pipes 27*a*, 27*b* so that oil is discarded to the oil tank 26 by opening the valve at a failure of the pump (pump breakdown) or the like. A rotating shaft of the reversible pump 24 is engaged with the electric motor 20 and is driven capable of forward/backward rotation by rotation of the electric motor 20 which receives a command current from a motor driver 21.

The power-steering control unit 17 is connected to the torque sensor 10 through a steering torque signal line 14, to a steer angle sensor 13 through a steer angle signal line 15, and to the motor driver 21 through a command value signal line 18, respectively. Though description will be made later using FIGS. 2 to 6, the power-steering control unit 17 calculates a command value to the electric motor 20 based on the steering torque inputted by the driver through operation of the steering wheel 16. The calculated command value is transmitted to the motor driver 21 through the command value signal line 18 and inputted to the electric motor 20 through a driver output cable 23.

Figure 2A:
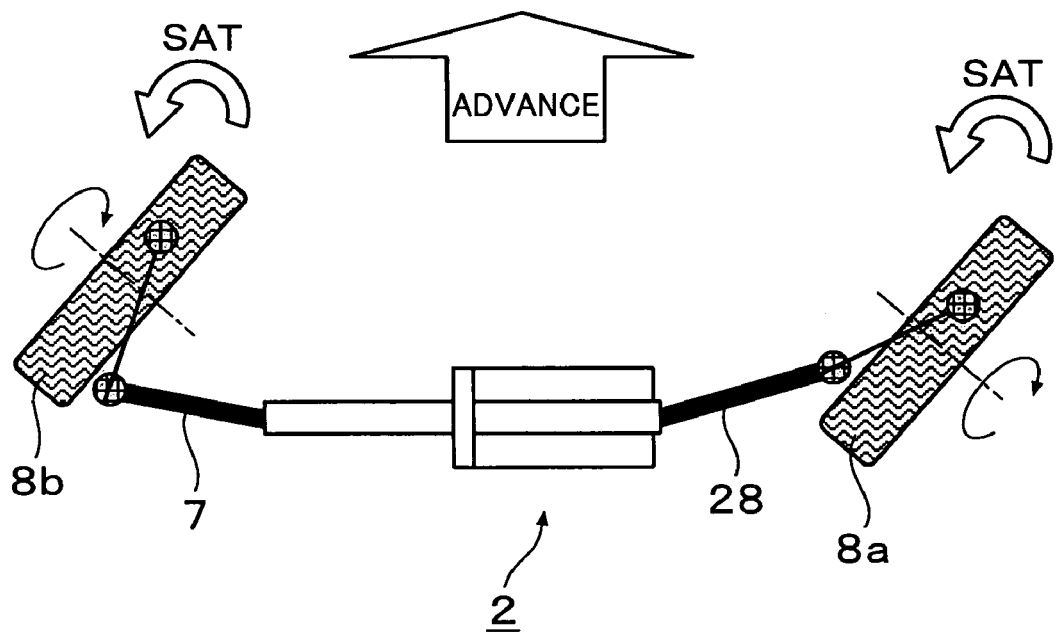
FIG. 2 is a diagram showing a moment generated at a steering tire at forward or reverse driving of a vehicle of this embodiment.
Figure 2B:
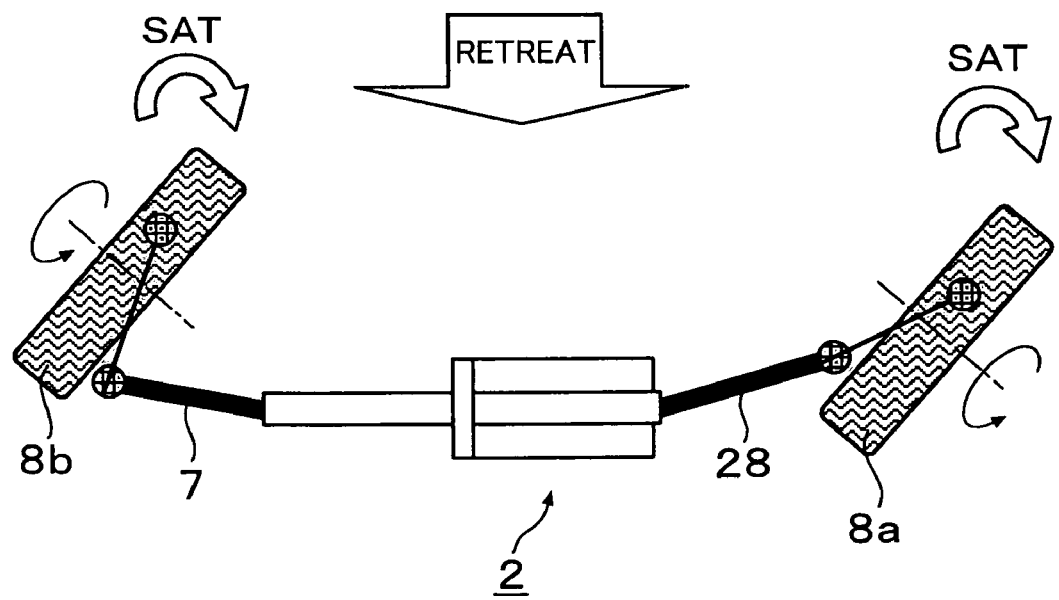

Next, a moment generated at a steering tire at lock-end advance or retreat will be described referring to FIG. 2. FIG. 2*a* is a schematic diagram of front wheels when a vehicle is advancing, while FIG. 2*b* shows the front wheels when the vehicle is retreating.

Generally speaking, a so-called lateral force is generated at a rotating wheel of a turning vehicle in the direction perpendicular to the rotating plane. Since the lateral force is distributed asymmetrically in the front and rear as well as in the right and left, a force application point of a resultant force does not match a grounding center of the tire. Thus, the lateral force generates a moment at the grounding center of the tire. This moment is called a self aligning torque (SAT). A phenomenon relating to this SAT is described in "Motion and Control of Automobile, second edition" by Masato Abe, Sankaido Publishing Co., Ltd., pp. 6 to 9, for example.

In this way, even if the steering is made in the same direction, an acting direction of SAT is just opposite between advance and retreat of a vehicle, as shown in FIG. 2. In moving forward, the SAT acts in the direction to return the steering (neutral direction), while in moving backward, the SAT acts in the steering direction. In the example shown in FIG. 2, the SAT acts in the neutral direction in moving forward, but the SAT may act in the neutral direction in moving backward depending on the vehicle model.

Next, referring to FIG. 3, an outline of an electric motor control flow corresponding to the lock end and the normal steering in the power steering system according to this embodiment will be described. When a driver operates the steering wheel 16 at Step S101, a steer angle is detected by the steer angle sensor 13 (Step S102). At Step S103, whether it is lock end or normal steering (lock end or not) is determined in a method, which will be described later in FIG. 4. Referring to FIG. 12, the determination on whether it is lock end or normal steering at Step S103 is to determine whether it is steering before lock end (normal steering) or return triggered by lock end (returning not relating to lock end is normal steering).

First, if it is determined as lock end, the routine goes on to Step S104, and a steering torque is detected by the steering torque sensor 10. The steer angle speed is calculated at Step S105 based on the steer angle detected at Step S102 (the speed of the steer angle after the steering state end point in FIG. 12 is calculated). Then, at Step S106, it is determined whether this steer angle speed is not less than a predetermined value or not (as will be described in detail in FIG. 5). If the steer angle speed is not less than the predetermined value, a correction assist torque is calculated at Step S107. How to calculate this correction assist torque will be described in detail at reference numeral 47 in FIG. 6 and in FIG. 8.

On the other hand, at Step S103, if it is determined as normal steering, the routine goes on to Step S114, and the steering torque is detected by the steering torque sensor 10. Based on the detected steering torque, the assist torque is calculated at Step S115.

In the above steps, a value of the assist torque required at transition from the lock end to the returning and at the normal steering is calculated. Next, at Step S121, the electric motor 20 is controlled (torque control) so as to generate the calculated assist torque. According to the driving of the motor, the pump is driven at Step S122, and as a result, at Step S123, the steering assist power is generated.

Next, referring to FIG. 4, how to determine the lock end will be described. The lateral axis in the figure indicates the steer angle, while the vertical axis indicates the lock-end determination flag FL, which is set to one for the lock end and zero for the normal steering. A range from the neutral position (automobile straight-driving state) to a preset steer angle (±A) is determined as the normal steering, while if the set steer angle (±A) is exceeded, it is determined as the lock end.

Also, for determination of the lock end, the following means other than the above-mentioned steer angle sensor can be used. The lock end state of the steering mechanism is determined based on the steering torque generated at the steering mechanism (value detected by the steering torque sensor) and the rotation speed of a motor. Also, the lock end state of the steering mechanism is determined based on the steering torque (value detected by the steering torque sensor) generated at the steering mechanism and the steering speed of the steering mechanism (calculated based on the steer angle by the steer angle sensor). Also, when the steering torque generated at the steering mechanism is not less than a specified value, it may be determined that the steering mechanism is in the lock end state.

Next, referring to FIG. 5, how to determine the steering speed will be described. The lateral axis in the figure indicates the steering speed, while the vertical axis for the steering speed determination flag Fs, which is one when the steering speed is not less than a threshold value B or not more than −B and it is zero for the other cases. The steering speed is calculated based on the steer angle by the steer angle sensor 13 detected at Step S102 in FIG. 3.

Next, referring to FIG. 6, a concrete example of a method to generate the command value to the electric motor 20 in the power steering controller 17 will be described. In the power steering controller 17, a steer angle signal 61 is inputted to a lock-end determination block 41, and the lock-end determination flag FL is calculated. For example, if the steering state is determined as the normal steering, it means FL=0, and the normal steering determination flag 43a becomes 1−FL=1 and control for the normal steering is selected. A torque command value calculation block 45 calculates a torque command value based on map information prepared in advance as schematically shown in FIG. 7 using a steering torque signal 60. The calculated command value is inputted to the motor driver 21 through the command-value signal line 18. At the motor driver 21, torque control is carried out by a control system, which will be described later in FIG. 9, using an armature current detected through an armature current signal line 22. To an output shaft 50 of the electric motor 20, a steering system load 51 such as a reversible pump is connected and driven by the electric motor 20.

On the other hand, if the steering state is determined as the lock end (determined as transition from the lock end to the returning (or no-hand on the steering wheel)), it means FL=1, a lock-end determination flag 43b becomes FL=1, and control for lock end is selected. If the steering speed is less than a predetermined value by a steering speed determination block 42, a determination speed determination flag 44a becomes 1−Fs=1, and the torque control is executed through a torque command value calculation block 46. The torque command value calculation block 46 calculates a torque command value based on characteristics (map information) shown in FIG. 7.

If the steering speed is not less than the predetermined value, the steering speed determination flag 44b calculates a correction torque command value by a correction torque command value calculation block 47. This calculated correction torque command value is based on the map information prepared in advance as schematically shown in FIG. 8 (solid-line graph in FIG. 8). In FIG. 8, a dotted line shows a torque command value at the normal steering, while the solid-line graph is used at correction for increasing correction as compared with the dotted-line graph.

The purpose that the motor torque command value is increasingly corrected when the steer angle speed is not less than a predetermined value (as compared with the case where the steer angle speed is not more than the predetermined value) is, as mentioned above, to prevent the motor torque from being defeated by the differential pressure and to have large braking act so that the pump rotating direction is not reversed early. As is clear from the graph of the motor torques of the present invention and the prior art shown in FIG. 12b, at transition from the end point in the returning state to the returning in the first embodiment, the motor driving torque is increased so that it is not defeated by the differential pressure between the high pressure side and the low pressure side of the cylinder. By this, as shown in FIG. 12b, the motor torque curve immediately after the end point in the returning state has a milder inclination than that of the prior art.

Also, one of the characteristics of this embodiment is to restrain (limit) the flow rate of the working oil supplied to the low-pressure side oil passage from the high-pressure side oil passage in the first oil passage and the second oil passage under a specific condition when the steering state of the steering mechanism is ended and transited to the returning. After this restraint control, the restraint control (limitation) of the flow rate of the working oil shall be finished when the power cylinder begins to move. Also, this driving current is gradually decreased after the above-mentioned increasing control of the driving signal to the motor is finished, and moreover, this increasing correction is finished after a predetermined time has passed from start of the increasing correction of this driving signal.

Next, referring to FIG. 9, a principle of the torque control executed at the motor driver 21 will be described. FIG. 9 is a general control block diagram of the electric motor 20 and the motor driver 21. This control block diagram is well known as shown in "How to Use Brushless DC Motor" by Koji Ogino, Ohmsha Co., Ltd., pp. 16 to 17.

In FIG. 9, each of the reference symbols denotes as follows: Ac: Current amplifier, La: Armature inductance, Ra: Armature resistance, KT: Torque constant, J: Motor shaft inertia, 1/Kc: Current detector, KE: Induced voltage constant, 1/s: Integration.

A difference between a current command value 70a and an armature current 70b from a current feedback loop is inputted to a current amplifier 72, and an induced voltage in proportion to a rotation speed 70e of the motor shaft is determined by the induced voltage constant block 76. The difference between the current command value and the induced voltage is inputted to an armature resistance/inductance characteristic block 73 so as to generate the armature current 70b, and a torque 70c to be generated by the electric motor 20 is determined at a torque constant block 74. By a difference between the torque 70c and a disturbance torque 70d, the motor-shaft rotation speed 70e is determined at a motor-shaft inertia block 75. In this construction, if a value of the current amplifier 72 is extremely increased, the armature current 70b in proportion to the current command 70a can be made to flow, and thus, the torque 70c also becomes in proportion to the current command 76a, and torque control is executed. Each constituent element shown in FIG. 9 is as described in Explanation of Reference Numerals.

In this embodiment, the power steering controller 17 and the motor driver 21 are provided separately, but they may be integrated. In this case, since the size of a system can be reduced, mountability on a vehicle is improved. Instead of the steer angle sensor 13 for discriminating the steering state, a sensor for detecting a stroke of the piston rod 28 may be used, for example, which is effective if there is no allowance in a space around the steering wheel 16.

In order to check that this embodiment is actually executed, connection between the power steering control unit 17 and the steering torque sensor 10 as well as the steer angle sensor 13 is disconnected, and a pseudo steering torque signal and a pseudo steer angle signal are applied to the power steering control unit 17. In this case, a command value of the command signal line 18 is monitored, and it is checked whether the directions of the command value and the steer angle speed match each other when the pseudo steering torque signal and the pseudo steer angle signal imitating the lock end are applied. Also, means for detecting a moving direction of the cylinder may be provided to confirm that the cylinder moving direction matches the acting direction of the assist torque.

Next, a power steering system according to another embodiment of the present invention will be described using FIG. 10. When a driver operates the steering wheel 16 at Step S201, a steer angle is detected by the steer angle sensor 13 (Step S202). At Step S203, whether it is the lock end or normal steering is determined.

If it is determined as the lock end (determined as transition from the lock end to the returning (or no-hand on the steering wheel)), the routine goes on to Step S204, and a steer angle speed is calculated based on the steer angle detected at Step S202. Next, at step S205, it is determined whether the steer angle speed is not less than a predetermined value or not. If the steer angle speed is not less than the predetermined value, a high-pressure side return valve (return valve 29a or 29b shown in FIG. 1) is opened at step S206.

On the other hand, if it is determined as normal steering at Step S203 and if it is determined that the steering speed is not more than the predetermined value at Step S205, the routine goes on to Step S207 without operating the return valve (return valve 29a or 29b shown in FIG. 1). At Step S207, the steering torque is detected, and at Step S208, the assist torque is calculated. At Step S209, the electric motor 20 is controlled (torque control) so as to generate the calculated assist torque. According to the driving of the motor, the pump is driven at Step S210, and as a result, the steering assist power is generated at Step S211.

In the above description, the return valves 29a, 29b between the hydraulic pipes 27a, 27b and the tank 26 are controlled, but not limited to this, a communication passage directly connecting the hydraulic pipes 27a and 27b (bypass passage of the pump 24) and a failsafe valve for switching between communication and shutoff of this communication passage may be provided, and this failsafe valve may be controlled.

A point that another embodiment of the present invention is different from the embodiment shown in FIG. 3 is that since the return valve is controlled, the failsafe performance is high, and since complexity of electric motor control can be avoided, costs can be reduced. Since the other constructions are the same as those of the embodiment operating as shown in FIG. 3, the description will be omitted.

Also, as a still another embodiment of the present invention, the following construction example can be considered. That is, as a detecting method at transition from the lock end to the returning of the steering mechanism, generation of a self aligning torque (See FIG. 2) urging the power cylinder in the steering direction may be detected, and a flow rate of the working oil supplied from the high-pressure side oil passage to the low-pressure side oil passage is restrained upon this detection. Moreover, in the above detecting method, a signal receiving portion is provided for receiving a signal indicating whether the transmission of the vehicle is in the forward driving state (drive position) or the reverse driving state (reverse position), and it may be determined based on the signal received by this signal receiving portion whether the self aligning torque is generated or not for urging the power cylinder in the steering direction. Moreover, the driving signal of the motor in the steering direction may be increasingly corrected when the steering mechanism is in the stand still state, and at this time, it is determined that the steering mechanism is in the stand still state when a vehicle speed is approximately 0 km/h.

As mentioned above, the main characteristics of the power steering system according to the embodiments of the present invention are that noise generation can be prevented by restraining the flow rate of the working oil flowing from the high-pressure side cylinder to the low-pressure side cylinder by employing a construction to provide a correcting means for increasingly correcting the driving signal of the motor for driving the hydraulic pump for the power cylinder or a limiting means for limiting the flow rate of the working oil supplied from the high-pressure side oil passage to the low-pressure side oil passage at transition from the lock end (end point of the steering state) to the returning of the steering mechanism. And as a specific construction of this embodiment, the following example can be considered. A power cylinder for assisting a steering power of the steering mechanism connected to the steering tire, a hydraulic pump for supplying a hydraulic pressure to the power cylinder, a motor for driving the hydraulic pump, and motor control means for outputting a driving signal to the motor according to a steering assist power applied to the steering tire are provided, and flow-rate restraining means is also provided for restraining the flow rate of the working oil supplied from a high-pressure side oil passage to a low-pressure side oil passage when a steering state of the steering mechanism is ended and transited to returning or no-hand on the steering wheel. This flow-rate restraining means finishes restraint of the flow rate of the working oil when the power cylinder begins to move. Also, a steer angle sensor is provided for detecting a steer angle speed of the steering mechanism so as to detect movement of the power cylinder.

Also, as the flow-rate restraining means, the driving signal of the motor in the steering direction is increasingly corrected. Moreover, after the increasing correction of this driving signal, the driving signal is gradually decreased. Alternatively, the increasing correction may be finished after a predetermined time has elapsed since start of the increasing correction of this driving signal.

Moreover, an oil passage to communicate the high-pressure side oil passage with the low-pressure side oil passage with each other is provided, and a failsafe valve for switching between communication and shutoff of this communication passage is provided so that the failsafe valve is brought into the communicating state when the steering state of the steering mechanism is ended. Also, the flow rate of the working oil may be limited when the generating direction of the steering torque generated at the steering mechanism does not match the direction of the rotation of the motor.

Moreover, the lock end state is determined based on the steering torque generated at the steering mechanism and the rotation speed of the motor. Alternatively, the lock end state may be determined based on the steering torque generated at the steering mechanism and the steering speed of the steering mechanism. Moreover, it may be determined that the steering mechanism is in the lock end state when the steering torque generated at the steering mechanism is not less than a predetermined value.

Also, it is preferable that the flow rate of the working oil be limited when the self aligning torque urging the power cylinder in the steering direction is generated. Moreover, a signal receiving portion is provided for receiving a signal indicating whether the transmission of the vehicle is in the forward driving state (drive position) or in the reverse driving state (reverse position) and it is determined whether the self aligning torque urging the power cylinder in the steering direction is generated or not based on the signal received by this signal receiving portion.

What is claimed is:

1. A power steering system comprising: a power cylinder for assisting a steering power of a steering mechanism made of a rack and pinion and the like connected to a steering tire; a hydraulic pump having a pair of discharge ports for selectively supplying a hydraulic pressure to both pressure chambers of said power cylinder; a first oil passage and a second oil passage for connecting each of the pair of discharge ports of said hydraulic pump to both the pressure chambers of said power cylinder, respectively; a motor for driving said hydraulic pump; and a power steering controller for calculating a command value to said motor based on a steering torque by operation of a steering wheel, wherein a flow rate of hydraulic fluid supplied from a high-pressure side oil passage to a low-pressure side oil passage in said first oil passage and said second oil passage is restrained at transition from lock end to returning.

2. The power steering system according to claim 1, wherein flow-rate restraint of said hydraulic fluid is carried out by increasingly correcting a driving current of said motor in the steering direction.

3. The power steering system according to claim 1, wherein flow-rate restraint of said hydraulic fluid is carried out by limiting the flow rate of the hydraulic fluid supplied from said high-pressure side oil passage to said low-pressure side oil passage.

4. The power steering system according to claim 3, wherein valves are provided between each of said first oil passage and said second oil passage and an oil tank respectively, and the flow rate of the hydraulic fluid supplied from said high-pressure side oil passage to said low-pressure side oil passage is limited by open-control of said valves.

5. The power steering system according to claim 3, wherein a communication passage connecting said first oil passage and said second oil passage and a failsafe valve for switching between communication and shutoff of said communication passage are provided, and the flow rate of the hydraulic fluid supplied from said high-pressure side oil passage to said low-pressure oil passage is limited by bringing said failsafe valve into a communicating state.

6. The power steering system according to claim 1, wherein a steering torque sensor for detecting a steering torque is provided at said steering mechanism, and the transition from the lock end to said returning is determined by detecting non-matching between the direction of a steering torque detected by said steering torque sensor and the direction of the rotation of said motor.

7. The power steering system according to claim 1, wherein a steer angle sensor for detecting a steer angle of said steering mechanism is provided, whether it is in the lock end state or not is determined based on the steer angle by said steer angle sensor, and a flow rate of the hydraulic fluid supplied from said high-pressure side oil passage to said low-pressure side oil passage is restrained when the determination result is the lock end state and a steer angle speed calculated based on the steer angle detected by said steer angle sensor is not less than a predetermined value.

8. The power steering system according to claim 7, wherein the flow rate of said hydraulic fluid is restrained by increasingly correcting a driving current of said motor in the steering direction when said steer angle speed is not less than a predetermined value.

9. The power steering system according to claim 7, wherein a flow rate of the hydraulic fluid is restrained by limiting said flow rate of the hydraulic fluid supplied from said high-pressure side oil passage to said low-pressure side oil passage when said steer angle speed is not less than a predetermined value.

10. The power steering system according to claim 1, wherein a steer angle sensor for detecting a steer angle of said steering mechanism is provided, a steering torque sensor for detecting a steering torque of said steering mechanism is provided, whether it is in the lock end state or not is determined based on the steering torque detected by said steering torque sensor and a rotation speed of said motor detected, and a flow rate of the hydraulic fluid supplied from said high-pressure side oil passage to said low-pressure side oil passage is restrained when the determination result is the lock end state and a steer angle speed detected by said steer angle sensor is not less than a predetermined value.

11. The power steering system according to claim 1, wherein a steer angle sensor for detecting a steer angle of said steering mechanism is provided, a steering torque sensor for detecting a steering torque of said steering mechanism is provided, whether it is in the lock end state or not is determined based on the steering torque detected by said steering torque sensor and a steer angle speed calculated based on the steer angle detected by said steer angle sensor, and a flow rate of the hydraulic fluid supplied from said high-pressure side oil passage to said low-pressure side oil passage is restrained when the determination result is the lock end state and the steer angle speed detected by said steer angle sensor is not less than a predetermined value.

12. The power steering system according to claim 1, wherein a steer angle sensor for detecting a steer angle of said steering mechanism is provided, a steering torque sensor for detecting a steering torque of said steering mechanism is provided, it is determined as the lock end state when a steering torque detected by said steering torque sensor is not less than a specified value, and a flow rate of the hydraulic fluid supplied from said high-pressure side oil passage to said low-pressure side oil passage is restrained in said determined lock end state, when a steer angle speed detected by said steer angle sensor is not less than a predetermined value.

13. The power steering system according to claim 1, wherein said flow-rate restraint of the hydraulic fluid is carried out when a self alignment torque urging said power cylinder in the steering direction is generated.

14. The power steering system according to claim 13, wherein a signal receiving portion is provided for receiving a signal indicating whether a transmission of vehicle is in a forward driving state or a reverse driving state, and said flow-rate restraint of the hydraulic fluid is carried out when the self alignment torque urging said power cylinder in the steering direction is generated based on the signal received by said signal receiving portion.

15. The power steering system according to claim 1, wherein in said flow-rate restraint of the hydraulic fluid, it is determined that said steering mechanism is in a stand still state when a vehicle speed is approximately 0 km/h, and said flow-rate restraint of the hydraulic fluid is carried out by increasingly correcting the driving current of said motor in the steering direction in said stand still state.

* * * * *

UNITED STATES PATENT AND TRADEMARK OFFICE
CERTIFICATE OF CORRECTION

| | | |
|---|---|---|
| PATENT NO. | : 7,648,003 B2 | Page 1 of 1 |
| APPLICATION NO. | : 11/654676 | |
| DATED | : January 19, 2010 | |
| INVENTOR(S) | : Miyajima et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Twenty-eighth Day of December, 2010

David J. Kappos
*Director of the United States Patent and Trademark Office*